(12) United States Patent
Cantonetti et al.

(10) Patent No.: US 8,557,900 B2
(45) Date of Patent: Oct. 15, 2013

(54) WATER-BASED CEMENT FOR PRODUCING TYRES

(75) Inventors: Veronica Cantonetti, Rome (IT); Salvatore Cotugno, Rome (IT)

(73) Assignee: Bridgestone Corporation, Tokyo (JP)

( * ) Notice: Subject to any disclaimer, the term of this patent is extended or adjusted under 35 U.S.C. 154(b) by 174 days.

(21) Appl. No.: 13/126,915

(22) PCT Filed: Oct. 29, 2009

(86) PCT No.: PCT/EP2009/064251
§ 371 (c)(1),
(2), (4) Date: Jul. 20, 2011

(87) PCT Pub. No.: WO2010/049470
PCT Pub. Date: May 6, 2010

(65) Prior Publication Data
US 2011/0275741 A1  Nov. 10, 2011

(30) Foreign Application Priority Data

Oct. 30, 2008 (EP) .................................. 08167989

(51) Int. Cl.
*C08K 5/00* (2006.01)
*C08K 3/00* (2006.01)
(52) U.S. Cl.
USPC .............................................. 524/236; 524/8
(58) Field of Classification Search
USPC ....................................................... 524/236
See application file for complete search history.

(56) References Cited

U.S. PATENT DOCUMENTS

| 3,689,452 A | 9/1972 | Burke, Jr. |
| 6,025,428 A | 2/2000 | Day |
| 2006/0155077 A1 * | 7/2006 | Galimberti et al. ........ 525/332.5 |

FOREIGN PATENT DOCUMENTS

| JP | 2000044735 A | * | 2/2000 |
| WO | 2004/050736 A1 | | 6/2004 |
| WO | 2008/006894 A1 | | 1/2008 |

OTHER PUBLICATIONS

Translation of JP 2000-044735, Yamaguchi, Feb. 15, 2000.*
International Search Report for International Application No. PCT/EP2009/064251 dated Dec. 1, 2009.

* cited by examiner

*Primary Examiner* — Hui Chin
(74) *Attorney, Agent, or Firm* — Sughrue Mion, PLLC

(57) ABSTRACT

A water-based cement for producing tires, having water as solvent, cross-linkable unsaturated-chain polymer base, of sulphur, reinforcing filler, zinc oxide, accelerators, and an emulsifier of the general formula (I)

$$[R_1R_2R_3NR_5(N(R_4)_3)_n]^{(n+1)+}(n+1)X^- \qquad (I)$$

where:

X is an anionic atom or group $R_1$, $R_2$ and $R_3$, which may be the same or different, are each $C_mH_{2m+1}$, where m ranges between 1 and 3, or $CH_2CHCH_2$ or $CHCHCH_3$ $R_4$ is $CH_2CHCH_2$ or $CHCHCH_3$ n is 0 or 1

$R_5$ is an aliphatic group $C_{15}$-$C_{22}$ when n is 0; and is an aliphatic group $C_8$-$C_{16}$ when n is 1 when n is 0, at least one of $R_1$, $R_2$, $R_3$ and $R_5$ has a double bond.

8 Claims, No Drawings

WATER-BASED CEMENT FOR PRODUCING TYRES

CROSS REFERENCE TO RELATED APPLICATIONS

This application is a National Stage of International Application No. PCT/EP2009/064251 filed Oct. 29, 2009, which claims priority from European Patent Application No. 08167989.6 filed Oct. 30, 2008, the contents of all of which are incorporated herein by reference in their entirety.

TECHNICAL FIELD

The present invention relates to a water-based cement for producing tyres.

BACKGROUND ART

In tyre manufacturing, cements are normally organic-solvent-based. Cements of this sort are highly adhesive and easy to use, mainly on account of rubber dissolving readily in organic solvents and so blending with other rubber to form practically one piece once the organic solvent evaporates.

For environmental reasons, recent European directives have imposed a drastic reduction in the use of organic solvents in the tyre industry, thus forcing manufacturers to devise alternative solutions to ensure correct adhesion of rubber layers.

One alternative to traditional cements is water-based cements, in which organic solvent is replaced by water as solvent, and which poses the problem of ensuring dispersion in water of intrinsically hydrophobic ingredients. This is done using emulsifiers which, as is known, comprise a hydrophobic group capable of bonding the ingredient in question, and a hydrophilic group capable of ensuring its dispersion in water. Since emulsifiers are normally selectively effective as regards a particular compound, the making of water-based cement calls for using different types of emulsifiers.

Tests show that the presence of large quantities and different types of emulsifiers may impair the adhesive strength of the cement, hence the strong demand for water-based cement emulsifiers that are effective over a wide range of ingredients, to reduce both the quantity and the number of types of emulsifiers used.

The Applicant has surprisingly discovered a particular class of emulsifiers that is universally effective over the various ingredients of water-based cement.

According to the present invention, there is provided a water-based cement for producing tyres, comprising water as solvent, a cross-linkable unsaturated-chain polymer base, sulphur, reinforcing filler, zinc oxide, and accelerators; said cement being characterized by comprising an emulsifier of the general formula (I)

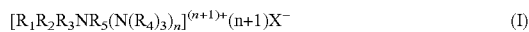

$$[R_1R_2R_3NR_5(N(R_4)_3)_n]^{(n+1)+}(n+1)X^-  \quad (I)$$

where:

X is an anionic atom or group $R_1$, $R_2$ and $R_3$, which may be the same or different, are each $C_mH_{2m+1}$, where m ranges between 1 and 3, or $CH_2CHCH_2$ or $CHCHCH_3$ $R_4$ is $CH_2CHCH_2$ or $CHCHCH_3$ n is 0 or 1

$R_5$ is an aliphatic group $C_{15}$-$C_{22}$ when n is 0; and is an aliphatic group $C_8$-$C_{16}$ when n is 1 when n is 0, at least one of $R_1$, $R_2$, $R_3$ and $R_5$ comprises a double bond.

Preferably, the water-based cement comprises by weight 5 to 80% of water, 10 to 60% of a cross-linkable unsaturated-chain polymer base, 0.2 to 1% of sulphur, 1 to 25% of reinforcing filler, 0.1 to 3% of zinc oxide, and 0.1 to 1% of accelerators; said cement being characterized by comprising 0.1 to 10% of an emulsifier of the general formula (I).

Preferably, $R_1$, $R_2$ and $R_3$ are $CH_2CHCH_2$.

Preferably, $R_1$, $R_2$ and $R_3$ are $CH_2CHCH_2$, $R_5$ comprises a double bond, and n is 0.

Preferably, $R_1$, $R_2$ and $R_3$ are $CH_2CHCH_2$, n is 1, and $R_5$ is a saturated aliphatic group.

Preferably, the quantity of emulsifier in the cement ranges between 0.5 and 5% by weight.

The examples below are purely indicative and non-limiting, for a clearer understanding of the invention.

EXAMPLES

Six water-based cements (A, B, C, D, E, F) in accordance with the present invention were prepared.

Table I shows the compositions, in percentage by weight, of the six cements.

TABLE I

|  | A | B | C | D | E | F |
| --- | --- | --- | --- | --- | --- | --- |
| WATER | 50 | 50 | 50 | 50 | 50 | 50 |
| NATURAL RUBBER | 25 | 25 | 25 | 25 | 25 | 25 |
| CARBON BLACK | 13 | 13 | 13 | 13 | 13 | 13 |
| ZINC OXIDE | 1 | 1 | 1 | 1 | 1 | 1 |
| ADHESIVE RESIN | 3.6 | 3.6 | 3.6 | 3.6 | 3.6 | 3.6 |
| SULPHUR | 0.5 | 0.5 | 0.5 | 0.5 | 0.5 | 0.5 |
| SULPHONAMIDE | 0.5 | 0.5 | 0.5 | 0.5 | 0.5 | 0.5 |
| EMULSIFIER (a) | 2 | — | — | — | — | — |
| EMULSIFIER (b) | — | 2 | — | — | — | — |
| EMULSIFIER (c) | — | — | 2 | — | — | — |
| EMULSIFIER (d) | — | — | — | 2 | — | — |
| EMULSIFIER (e) | — | — | — | — | 2 | — |
| EMULSIFIER (f) | — | — | — | — | — | 2 |

The emulsifier (a) according to the present invention used in cement A is of the formula $[(CH_3)_3N(CH_2)_8CHCH(CH_2)_7CH_3]^+ I^-$.

The emulsifier (b) according to the present invention used in cement B is of the formula $[(CH_2CHCH_2)_3N(CH_2)_{15}CH_3]^+ Br^-$.

The emulsifier (c) according to the present invention used in cement C is of the formula $[(CH_3)(CH_2CHCH_2)_2N(CH_2)_{15}CH_3]^+ I^-$.

The emulsifier (d) according to the present invention used in cement D is of the formula $[(CH_2CHCH_2)(CH_3)_2N(CH_2)_{15}CH_3]^+ I^-$.

The emulsifier (e) according to the present invention used in cement E is of the formula $[(CH_2CHCH_2)_3N(CH_2)_8CHCH(CH_2)_7CH_3]^+ I^-$.

The emulsifier (f) according to the present invention used in cement F is of the formula $[(CH_2CHCH_2)_3N(CH_2)_{12}N(CH_2CHCH_2)_3]^{2+} 2Br^-$.

To accurately assess the advantages of the cements according to the present invention, two comparison cements (G and H) were prepared. Cement G is a solvent-based cement, and cement H a known water-based cement.

Table II shows the compositions, in percentage by weight, of cements G and H.

TABLE II

|  | G | H |
|---|---|---|
| WATER | — | 50.0 |
| HEPTANE | 70.0 | — |
| NATURAL RUBBER | 18.0 | 25.0 |
| CARBON BLACK | 9.0 | 13.0 |
| STEARIC ACID | 0.6 | — |
| ZINC OXIDE | 0.3 | 1.0 |
| ADHESIVE RESIN | 2.0 | 5.0 |
| SULPHUR | 0.3 | 0.5 |
| SULPHONAMIDE | 0.3 | 0.5 |
| STANDARD EMULSIFIERS | — | 5.0 |

The standard emulsifiers used in cement H are: naphthyl-sulphonic acid for dispersing zinc oxide, sulphur, and accelerators; ethoxylated aliphatic amines and ethoxylated fatty acids for dispersing carbon black.

As will be clear to an expert, in addition to natural rubber, the cements according to the present invention may comprise any cross-linkable chain polymer base obtained by polymerization of conjugate dienes and/or aliphatic or aromatic vinyl monomers. For example, usable polymer bases are selected from the group comprising natural rubber, 1,4-cis polyisoprene, polybutadiene, isoprene-isobutene copolymers, possibly halogenated, butadiene-acrylonitrile copolymers, styrene-butadiene copolymers and styrene-butadiene-isoprene terpolymers, both in solution and emulsion, and ethylene-propylene-diene terpolymers. The above polymer bases may be used singly or mixed.

Laboratory Tests

Each cement was adhesion-tested on both green and cured rubber, as per ASTM Standard D624, was tested for rheometric properties as per ASTM Standard D5289, and was viscosity-tested as per ASTM Standard D6080. Table III shows the test results.

TABLE III

|  | A | B | C | D | E | F | G | H |
|---|---|---|---|---|---|---|---|---|
| Viscosity (cps) | 100 | 100 | 100 | 100 | 100 | 100 | 100 | 100 |
| ML (dNm) | 2.1 | 2.1 | 2.4 | 2.5 | 2.6 | 3.0 | 2.1 | 2.0 |
| MH (dNm) | 18.0 | 20.8 | 19.1 | 19.4 | 20.5 | 25.1 | 18.0 | 16.8 |
| T10 (min) | 0.7 | 0.7 | 0.8 | 0.8 | 0.6 | 1.0 | 0.7 | 0.5 |
| T50 (min) | 1.1 | 1.3 | 1.4 | 1.2 | 1.7 | 1.6 | 1.1 | 1.1 |
| T90 (min) | 2.9 | 2.7 | 2.9 | 3.0 | 2.5 | 3.5 | 2.9 | 3.0 |
| Green-rubber adhesion (N/mm) | 1.5 | 1.6 | 1.5 | 1.8 | 2.0 | 2.1 | 2.0 | 1.20 |
| Cured-rubber adhesion* (N/mm) | 19.7 | 23.0 | 21.0 | 20.6 | 23.5 | 25.0 | 20.0 | 10.0 |

*The cured rubber was obtained as per ASTM Standard 1382, by curing for 10 minutes at a constant temperature of 160° C.

As shown in Table III, the cements according to the present invention using emulsifiers of formula (I) need less emulsifier as compared with water-based cements of the prior art, and as such are highly stable and of even greater adhesion strength than solvent-based cements.

In short, using a universal emulsifier, different types of emulsifier need no longer be used, and the amount of emulsifier used can be greatly reduced.

As shown by the results in Table III, using an emulsifier as claimed in no way impairs the other characteristics of the cement, such as viscosity and rheometric properties.

The invention claimed is:

1. A water-based cement for producing tyres, comprising water as solvent, a cross-linkable unsaturated-chain polymer base, sulphur, reinforcing filler, zinc oxide, accelerators; said cement being characterized by comprising an emulsifier of the general formula (I)

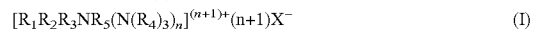
$$[R_1R_2R_3NR_5(N(R_4)_3)_n]^{(n+1)+}(n+1)X^- \qquad (I)$$

where:
X is an anionic atom or group;
$R_1$, $R_2$ and $R_3$, which may be the same or different, are each $C_mH_{2m+1}$, where m ranges between 1 and 3, or $CH_2CHCH_2$ or $CHCHCH_3$;
$R_4$ is $CH_2CHCH_2$ or $CHCHCH_3$;
n is 0 or 1;
$R_5$ is an aliphatic group $C_{15}$-$C_{22}$ when n is 0; and is an aliphatic group $C_8$-$C_{16}$ when n is 1;
when n is 0, at least one of $R_1$, $R_2$, $R_3$ and $R_5$ comprises a double bond.

2. A water-based cement for producing tyres as claimed in claim 1, characterized by comprising by weight 5 to 80% of water, 10 to 60% of a cross-linkable unsaturated-chain polymer base, 0.2 to 1% of sulphur, 1 to 25% of reinforcing filler, 0.1 to 3% of zinc oxide, and 0.1 to 1% of accelerators; said cement being characterized by comprising 0.1 to 10% of an emulsifier of the general formula (I).

3. A water-based cement for producing tyres, as claimed in claim 1, characterized in that $R_1$, $R_2$ and $R_3$ are $CH_2CHCH_2$.

4. A water-based cement for producing tyres, as claimed in claim 1, characterized in that $R_1$, $R_2$ and $R_3$ are $CH_2CHCH_2$, $R_5$ comprises a double bond, and n is 0.

5. A water-based cement for producing tyres, as claimed in claim 4, characterized in that said emulsifier is $[(CH_2CHCH_2)_3 N(CH_2)_8CHCH(CH_2)_7CH_3]^+X^-$.

6. A water-based cement for producing tyres, as claimed in claim 1, characterized in that $R_1$, $R_2$ and $R_3$ are $CH_2CHCH_2$, n is 1, and $R_5$ is a saturated aliphatic group.

7. A water-based cement for producing tyres, as claimed in claim 6, characterized in that said emulsifier is $[(CH_2CHCH_2)_3 N(CH_2)_{12}N(CH_2CHCH_2)_3]^{2+}2X^-$.

8. A tyre produced using a water-based cement as claimed in claim 1.

* * * * *